United States Patent Office 3,498,980
Patented Mar. 3, 1970

3,498,980
OXAZINOISOQUINOLINE DERIVATIVES
Frank H. Clarke, Jr., Armonk, N.Y., assignor to Geigy Chemical Corporation, Ardsley, N.Y., a corporation of New York
No Drawing. Continuation-in-part of application Ser. No. 634,856, May 1, 1967. This application Dec. 9, 1968, Ser. No. 782,443
Int. Cl. C07d 87/32, 87/30, 87/44
U.S. Cl. 260—244                               9 Claims

ABSTRACT OF THE DISCLOSURE 3-carboxy and 3-cyano derivatives of 9-alkoxy-, 9,10-dialkoxy-, 9,10,11-trialkoxy-, and 9,10-methylenedioxy-1,3,4,6,7,11b-hexahydro - [1,4]oxazino[3,4a]isoquinolines and their salts, are intermediates for the preparation of the corresponding 3-carboxamido compounds which possess tranquilizing and muscle relaxant properties. Typical embodiments are 3-carbomethoxy-9,10-dimethoxy-1,3,4,6,7,11b-hexahydro-[1,4]oxazino[3,4a]isoquinoline and 9,10 - dimethoxy - 1,3,4,6,7,11b-hexahydro-[1,4]oxazino[3,4a]isoquinoline-3-carboxylic acid.

CROSS REFERENCE

This is a continuation-in-part of copending applications Ser. No. 634,856, filed May 1, 1967, now abandoned, and Ser. No. 724,622 filed Apr. 26, 1968, Ser. No. 724,622 being a continuation-in-part of Ser. No. 634,856.

DETAILED DESCRIPTION

The present invention pertains to novel derivatives of [1,4]oxazino[3,4]isoquinolines, to methods for their preparation and use, and to intermediates useful in their preparation.

In particular, the present invention pertains to processes for the preparation of compounds, and to the compounds themselves, of the formula:

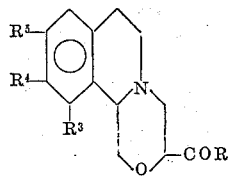

(I)

wherein:

R is hydroxy, chloro, bromo or (lower)alkoxy;
each of $R^3$ and $R^4$ is hydrogen or (lower)alkoxy; and
$R^5$ is (lower)alkoxy or
$R^4$ and $R^5$ taken together when $R^3$ is hydrogen are methylenedioxy;

and the acid addition salts thereof with organic and inorganic acids.

By the term "(lower)alkyl" and derivations thereof utilizing the root "alk," such as "(lower)alkoxy," "(lower)alkanoyloxy," and the like, is intended, unless otherwise qualified, a group comprising a branched or straight hydrocarbon chain containing from one to six carbon atoms. Representative of (lower)alkyl groups are thus methyl, ethyl, propyl, i-propyl, butyl, s-butyl, t-butyl, pentyl, isopentyl, hexyl and the like. Embraced by lower alkoxy are groups containing from one to six carbon atoms and joined through an oxygen ether bond, such as methoxy, ethoxy, i-propoxy, butoxy and the like. It is to be understood that when the nature of any particular functional group in these moieties requires two carbon atoms, the hydrocarbon portion of the moiety will have from two to seven carbon atoms. Thus "(lower)alkanoyloxy" is typified by acetoxy, propanoyloxy, butanoyloxy, pentanoyloxy, hexanoyloxy and the like.

With greater particularity to Formula I, the compounds of the present invention are named in accordance with the conventions of Chemical Abstracts as derivatives of [1,4]oxazino[3,4a]isoquinoline, the nucleus of which is represented and numbered as follows:

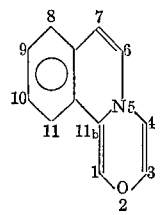

(II)

The novel compounds of the present invention are thus derivatives of 1,3,4,6,7,11b - hexahydro - [1,4]oxazino [3,4a]isoquinolines.

The compounds of the present invention are either unsubstituted or substituted by a (lower)alkoxy group, preferably methoxy, in the 10 and/or 11 positions and substituted by a (lower)alkoxy group, preferably methoxy, in the 9 position. Alternatively when unsubstituted in the 11 position, there can be a methylenedioxy group bridging the 9 and 10 positions. Preferred species are those which are disubstituted by methoxy in the 9 and 10 positions.

The foregoing compounds are chemical intermediates useful in the preparation of the 3-carboxamido-1,3,4,6,7,11b-hexahydro-[1,4]oxazino[3,4a]isoquinolines described and claimed in copending application Ser. No. 724,622. These 3-carboxamido compounds possess tranquilizing and muscle relaxing properties. They are accordingly useful in combatting agitation and hyperactivity in animals, in preoperative treatment and in the treatment of anxiety, tension and apprehension occurring alone or in association with various physiological disorders. These 3-carboxamido compounds advantageously have a high therapeutic index and do not appear to deplete norepinephrine at normal dosage levels. Generally the compounds are administered at levels of from about 5 to about 75 mg./kg. of body weight although as with any agent of this type, the dose will vary depending upon the patient and condition.

One important embodiment of the present invention is the acid addition salts of the compounds of Formula I. Such salts include those derived from both organic and inorganic acids such as, without limitation, hydrochloric, hydrobromic, sulfuric, phosphoric, methanesulfonic, acetic, lactic, succinic, malic, maleic, aconitic, phthalic, tartaric, embonic and the like acids. When R is hydrogen, the compounds are amphoteric and can form internal salts.

The presnce of asymmetric substition on the 3- and 11b-carbon atoms permits the existence of four isomeric forms. These correspond to the two enantiomorphs of the stereoisomer wherein the hydrogen atoms in positions 3 and 11b are in the cis relationships and the two enantiomorphs of the stereoisomer wherein these hydrogen atoms are in the trans relationship. Two such stereoisomeric racemates have been obtained and arbitrarily designated isomer I and isomer II, it being believed on the basis of present studies that isomer I corresponds to cis and isomer II corresponds to trans. Isomer I can be rearranged to the more stable isomer II through the action of strong base. The two pairs of enantiomorphs, i.e., the mixture of racemic isomer I and racemic isomer II, are separable into the individual racemates through fractional crystallization, chromatography or the like by reason of their different physical properties while the individual enantiomorphs of each pair are separated through the use of optically active acids according to conventional techniques. All such isomeric forms are within the purview of the present invention.

The compounds of the present invention are employed in the preparation of 3-carboxamido-1,3,4,6,7-11b-hexahydro-[1,4]-oxazino[3,4a]isoquinolines by treating the acids or esters of Formula I or an acid halide thereof with an amine of the formula:

wherein each of $R^1$ and $R^2$ taken independently is hydrogen or (lower)alkyl and $R^1$ nd $R^2$ taken together with the nitrogen atom to which they are attached are morpholino, piperidino, pyrrolidino, N'-[(lower)alkyl]piperazino, N'-hydroxy(lower)-alkyl]piperazino, or N'-[(lower) alkoxy(lower)alkyl]piperazino. In those instances in which R is chloro or bromo, the reaction is performed in the presence of an acid binding agent.

An alkali metal salt of the amine, such as the lithium amide, may be alternatively employed in place of the amine.

The reaction of the carboxylic acid derivatives of Formula I and the above amines can be performed at room temperature or at slightly elevated temperature. When the reaction is strongly exothermic, it can be attenuated by means of external cooling. An inert solvent can be advantageously employed, particularly for those derivatives in which R is chloro or bromo, in which case case the solvent should also be non-aqueous. Suitable inert solvents include hydrocarbons, particularly mononuclear aromatic hydrocarbons such as benzene, toluene and xylene; chlorinated lower alkanes, such as 1,2-dichloroethane and the trichloroethanes; or hydrocarbon ethers such as 1,2-dimethoxyethane or 1,2-diethoxyethane. When R is (lower)alkoxy, aqueous or non-aqueous (lower)alkanols can also be employed.

The compounds of Formula I can be prepared from the corresponding cyano compound. Thus 3-cyano-1,3,4,6,7,11b-hexahydro-[1,4]oxazino[3,4a]isoquinolines of Formula IV are hydrolysed with base such as potassium or sodium hydroxide to the corresponding carboxylic acids or salts thereof:

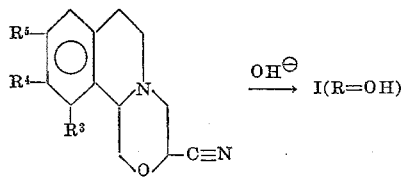

The acids of Formula I can be esterified employing conventional techniques to yield the 3-carbalkoxy compounds of Formula I [R=(lower)alkoxy] or converted to the acid halides as with oxalyl chloride, thionyl chloride or the like.

Alternatively the nitriles of Formula IV are converted directly to the corresponding esters through treatment with a (lower)alkanol in the presence of an acid and waer. Using acidic conditions, as for example sulfuric acid or hydrochloric acid in ethanol, the configuration of the starting 3-cyano compounds is maintained and the resulting 3-carbalkoxy derivative thus is of the same isomeric form as the nitrile. Use of base however generally results in formation of isomer II. Similarly basic hydrolysis of the 3-carbalkoxy derivatives under conditions in which the ester is in solution leads primarily to the corresponding acid of the isomer II series. Basic hydrolysis of a suspension of the ester on the other hand maintains the configuration of the starting ester.

Those compounds of Formula I wherein R is hydroxy can also be used to form a mixed anhydride through the action of a (lower)alkyl chloroformate or benzyl chloroformate in the presence of an acid binding agent such as triethylamine. The resulting mixed anhydride need not be isolated but is allowed to react in situ with the appropriate amine, to yield the 3-carboxamido compounds described above.

The 3-cyano compounds of Formula IV are prepared through Lewis acid cyclization of a 2-cyano or 2-carboxamido-4-phenethylmorpholin-5-one of Formula V and reduction of the intermediate product, either chemically with complex hydrides such as sodium borohydride or catalytically as with palladium on carbon. This leads to a mixture of isomer I and II which can be separated as by fractional crystallization or can be used as a mixture with subsequent isomerization to isomer II. The cyclization and reduction reactions can be represented as follows:

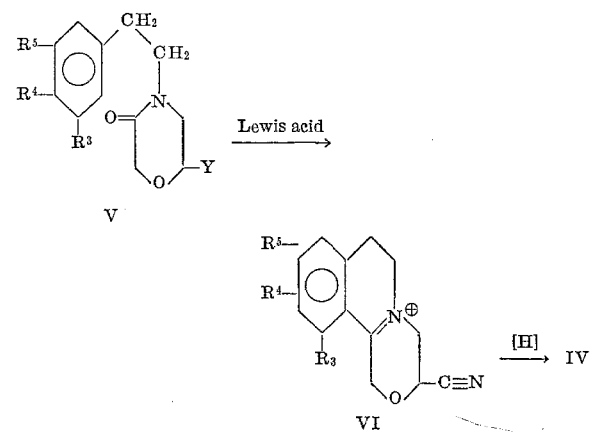

In the above, Y is cyano or carboxamido and $R^3$, $R^4$ and $R^5$ are as defined above. In the above transformation of V and VI suitable Lewis acids include polyphosphoric acid, phosphorus trichloride, phosphorus tribromide, phosphorus pentachloride, phosphorus oxychloride, borontrifluoride etherate, aluminum chloride, stannic chloride and the like, particularly phosphorus oxychloride, phosphorus trichloride and polyphosphoric acid. Suitable solvents for this cylization include halogenated (lower)alkanes such as 1,2-dichloroethane, trichloroethanes, trichloropropanes and the like. Starting materials of Formula V bearing an unsubstituted carboxamido group in the 2-position, under the preferred conditions of the cyclization, generally undergo acid catalysed dehydration and the product is thus the 3-cyano compound of Formula VI.

The 4-phenethylmorpholin-5-ones of Formula V are prepared through condensation of an appropriately substituted phenethylamine and an epoxide of acrylonitrile or of acrylamide and treatment of the resulting 2-hydroxy-3-phenethylamino-propionitrile or -propionamide, respectively, with sodium hydride and ethyl chloroacetate. These reactions may be represented as follows:

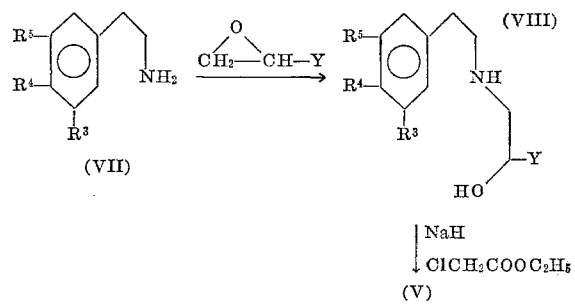

In the foregoing $R^3$, $R^4$, $R^5$ and Y are as previously defined.

The following examples will serve to further typify the nature of the present invention but should not be construed as a limitation on the scope thereof.

EXAMPLE 1

3-cyano-9,10-dimethoxy-1,3,4,6,7,11b-hexahydro-[1,4]oxazino[3,4a]isoquinoline (A) To a solution of 30.93 g. (0.3 mole) of benzonitrile in 150 ml. of methanol are added with stirring, 17.7 g. of acrylamide. Upon complete dissolution there are sequentially added 30 ml. (0.3 mole) of 30% aqueous hydrogen peroxide, 5 ml. of 0.1 M aqueous disodium hydrogen phosphate and 5 ml. of 0.5 N aqueous sodium hydroxide. The solution's temperature is maintained at about 40° C. through cooling and an additional 20 ml. of 0.5 N aqueous sodium hydroxide are added in 5 ml. portions every 30 minutes. The mixture is then stirred for an additional 30 minutes (total reaction time—2½ hours), evaporated in vacuo to remove the methanol, diluted with 100 ml. of water, and filtered. The solid thus collected is washed with a little water and the combined filtrate and washings are evaporated in vacuo. The oily residue is taken up in 100 ml. of acetone and this solution is dried over magnesium sulfate, filtered and evaporated in vacuo to give a pale yellow oil comprising glycidamide which is dissolved in 40 ml. of 1,2-dimethoxyethane and used immediately in the following procedures without further purification.

(B) To 39 ml. of the above solution of glycidamide in a cooling bath is added a molar equivalent amount of an approximately 2 molar solution of 2-(3,4-dimethoxyphenyl)-ethylamine in 1,2-dimethoxyethane. (The molar amount of glycidamide is determined by treatment of a 1 ml. aliquot of the 1,2-dimethoxyethane solution with 50 ml. of standardized 0.1 N hydrochloric acid in saturated aqueous magnesium chloride and titration, after a 30 minute reaction period, of the amount of hydrochloric acid consumed with 0.100 aqueous sodium hydroxide to methyl red indicator.) The solid which forms is slurried with ether, collected by filtration, washed with ether and dried to yield a 2-hydroxy-3-[2-(3,4-dimethoxyphenyl)ethylamino]-propionamide, which may be used in the following procedure without further purification. A pure sample obtained through recrystallization from methanol demonstrates a melting point of 123–128° C.

(C) To 35 ml. of a 1:1 mixture of benzene and dimethylformamide, previously dried through removal by distillation of about 10 ml., is added at room temperature 1.4 g. (0.034 mole) of a 60% dispersion of sodium hydride in mineral oil. Seven grams (0.026 mole) of 2-hydroxy-3-[2-(3,4-dimethoxyphenyl)ethylamino]-propionamide are then added. The mixture is stirred for ten minutes, during which time the evolution of hydrogen may occur, cooled, treated with 2.8 ml. (0.03 mole) of ethyl chloroacetate. After stirring for 15 minutes with gentle heating as necessary, this reaction mixture is diluted with 100 ml. of dry benzene and heated at reflux under anhydrous conditions for 21 hours. The solvents are then removed in vacuo and the residue is triturated with acetone. After standing for 16 hours at room temperature, the mixture is filtered and the solid thus collected is washed with a little acetone and dried in vacuo to yield 2-carboxamido-4-[2-(3,4 - dimethoxyphenyl)ethyl]morpholin-5-one, M.P. 159–164° C. Upon recrystallization from acetone, the material demonstrates a melting point of 169–171° C.

(D) A solution of 4.47 g. of 2-carboxamido-4-[2-(3,4-dimethoxyphenyl)ethyl]morpholin-5-one in 5.2 ml. )of freshly distilled phosphorus oxychloride and 122 ml. of 1,2-dichloroethane is heated at reflux under anhydrous conditions for 2 hours. The solvent is then removed in vacuo at 80° C. and the residue dried over potassium hydroxide in vacuo at room temperature for 18 hours, dissolved in 85 ml. of methanol and diluted with 9.4 ml. of water. This solution is cooled and treated portionwise with 2.44 g. of sodium borohydride. After removing the solvents in vacuo, the residue is treated with 30 ml. of 2.5 N aqueous hydrochloric acid. This solution is washed with ether, rendered basic with 4 N sodium hydroxide and extracted three times with 20 ml. portions of methylene chloride. The combined methylene chloride extracts are dried over magnesium sulfate, filtered and evaporated to dryness to yield 3-cyano-9,10-dimethoxy-1,3,4,6,7,11b-hexahydro - [1,4]oxazino[3,4a]isoquinoline which is further purified through recrystallization from absolute ethanol with charcoal clarification as necessary, M.P. 182–184° C. (isomer I). Treatment of an ethereal solution of this compound with hydrogen chloride yields the corresponding hydrochloride salt.

Concentration of the mother liquors yields isomer II of 3-cyano-9,10-dimethoxy - 1,3,4,6,7,11b - hexahydro-[1,4]isoquinoline, M.P. 175–177° C. This isomer is also obtained from isomer II of 3-carboxamido-9,10-dimethoxy - 1,3,4,6,7,11b - hexahydro - [1,4]oxazino[3,4a]isoquinoline, M.P. 237.5–240.5, described hereinafter, through dehydration with phosphorus oxychloride in refluxing 1,2-dichloroethane.

The product of the phosphorus oxychloride cyclization in the principal procedure of part D of this example can also be reduced with 10% palladium on charcoal to yield the identical product.

EXAMPLE 2

3-cyano-9,10-methylenedioxy-1,3,4,6,7-11b-hexahydro-[1,4]oxazino[3,4a]isoquinoline (A) A solution of 49.2 g. of 2-(3,4-methylenedioxyphenyl)ethylamine hydrochloride M.P. 210–212° in 1.25 liters of water is treated with 10% aqueous sodium carbonate until the pH is 9–10 (test paper). The mixture is extracted three times with 500 ml. portions of methylene chloride and the combined extracts are dried over magnesium sulfate, filtered and evaporated in vacuo at 90° C. to yield the free amine as a pale red gum. A solution of the free amine in 25 ml. of 1,2-dimethoxyethane is stirred with 96 ml. of a 2.56 M solution of glycidamide in 1,2-dimethoxyethane with cooling in a cold-water bath for one hour and then allowed to stand in the bath for an additional 18 hours. Acetone is added to yield a slurry of crystalline material which is collected by filtration and recrystallized twice from isopropanol to yield 2-hydroxy-3-[2 - (3,4 - methylenedioxyphenyl)ethyl]propionamide, M.P. 141—140° C.

(B) To a solution of 26.2 g. of the above propionamide in 500 ml. of dimethylformamide are added 11 g. of anhydrous sodium acetate. This mixture is stirred with cooling in an ice-water bath and a solution of 8 ml. of chloroacetyl chloride in 80 ml. of dimethylformamide is added over a two hour period, maintaining a temperature of 10° C. The reaction mixture is stirred with cooling for an additional hour and then allowed to stand overnight at room temperature. The reaction mixture is next poured into 600 ml. of water, maintaining the temperature below 25° C. and this mixture is then extracted three times with 100 ml. portions of methylene chloride. The combined extracts are dried over magnesium sulfate, filtered and evaporated in vacuo at 80° C. to yield an oil.

To a solution of this oil in 200 ml. of isopropanol, cooled in an ice-water bath, are added dropwise and with stirring, 12 ml. of 50% aqueous sodium hydroxide. The mixture is stirred for an additional one hour and the white precipitate is collected by filtration and suspended in 200 ml. of water for 18 hours. The remaining solid is collected by filtration and dried in vacuo at 50° C. to yield 2-carboxamido - 4 - [2-(3,4-methylenedioxyphenyl)ethyl]morpholin-5-one which upon recrystallization from ethanol demonstrates a melting point of 236–237° C.

(C) A mixture of 4 g. of 2-carboxamido-4-[2-(3,4-methylenedioxyphenyl)ethyl]morpholin-5-one, 6.3 ml. of phosphorus oxychloride and 40 ml. of 1,2-dichloroethane is heated at reflux for two hours (bath temperature 90°, "Drierite" guard tube) and then evaporated in vacuo at 100° C. The residue is dissolved in 45 ml. of methanol and 2 ml. of 50% aqueous sodium hydroxide are added. The solution is still acidic. There is next added portionwise, with stirring and cooling in an ice-water bath, 1.67 g. of sodium borohydride. After stirring overnight, the finely-divided pink solid is collected by filtration, and suspended in 50 ml. of water. This suspension is extracted three times with 150 ml. portions of methylene chloride and the combined extracts are dried over magnesium sulfate, filtered and evaporated in vacuo at 100° C. to yield crude 3-cyano-9,10-methylenedioxy-1,3,4,6,7,11b - hexahydro-[1,4]oxazino[3,4a]isoquinoline. The aqueous methanolic filtrate is evaporated to dryness in vacuo at 90° C. and the residue is treated with 30 ml. of saturated aqueous sodium hydrogen carbonate. This mixture is in turn extracted four times with 20 ml. portions of methylene chloride. The combined extracts are dried over magnesium sulfate, filtered and evaporated in vacuo at 90° C. to yield a semi-crystalline gum. Trituration of this material with 2B ethanol and filtratiton yields additional crude nitrile.

The two samples are combined and recrystallized from 2B ethanol to yield a mixture of the two isomers of 3-cyano - 9,10 - methylenedioxy-1,3,4,6,7,11b-hexahydro-[1,4]oxazino[3,4a]isoquinoline, M.P. 168–183° C. Pure isomer I, M.P. 190–192° C. can be obtained from this mixture of isomers by fractional crystallization from ethyl acetate. Pure isomer II melts at 169–170°.

In a similar fashion, employing 2-(3,4,5-trimethoxyphenyl)ethylamine in the foregoing procedure there are sequentially obtained 2-hydroxy-3-[2-(3,4,5-trimethoxyphenyl)ethyl]propionamide, M.P. 136–137° C. (isopropanol); 2-carboxamido-4-[2-(3,4,5 - trimethoxyphenyl) ethyl]morpholin-5-one, M.P. 204.5–206° C. (isopropanol); and 3-cyano-9,10,11-trimethoxy-1,3,4,6,7,11b-hexahydro-[1,4]oxazino[3,4a]isoquinoline (isomer II) M.P. 151–152° C. (ethanol).

EXAMPLE 3

3-(N,N-diethylcarboxamido)-9,10-dimethoxy-1,3,4,6,7, 11b-hexahydro-[1,4]oxazino[3,4a]isoquinoline (A) A mixture of 2.17 g. of 3-cyano-9,10-dimethoxy-1,3,4,6,7,11b - hexahydro-[1,4]oxazino[3,4a]isoquinoline, 32.2 ml. of 0.5 N ethanolic potassium hydroxide and 8.06 ml. of water is heated at reflux for 48 hours. At the end of this time, the mixture is evaporated in vacuo at 80° C. and the residue is treated with 25 ml. of benzene and re-evaporated. This procedure is repeated with an additional 25 ml. of benzene and the residue, comprising 9,10-dimethoxy - 1,3,4,6,7,11b - hexahydro - [1,4]oxazino[3,4a] isoquinoline-3-carboxylic acid, is dried in vacuo over phosphorus pentoxide for 96 hours.

Alternatively, 10.0 g. of 3-cyano-9,10-dimethoxy-1,3,4, 6,7,11b - hexahydro - [1,4]oxazino[3,4a]isoquinoline (a mixture of isomers I and II) are suspended in 75 ml. of 1 N aqueous sodium hydroxide and 110 ml. of water. This suspension is heated at reflux with a soda-lime guard tube for two hours, after which time a clear solution is obtained. The water is removed in vacuo at 80° C. to yield a pale brown gum which is treated with 50 ml. of 2.5 N aqueous hydrochloric acid to give a clear solution. Upon scratching, crystallization begins. After standing at room temperature for 18 hours the mixture is filtered and the crystals thus collected are washed with additional 2.5 N acid (a total of 20 ml.). After drying in vacuo for 18 hours at 50° C., off-white crystals of the carboxylic acid hydrochloride (isomers I and II), M.P. 200–205° (dec.) are obtained.

(B) The material obtainned according to the first procedure of Part A of this example is dissolved in 25 ml. of dry benzene and 5.83 ml. of redistilled oxalyl chloride are added. This mixture is stirred at room temperature for 48 hours and then at reflux for two hours. The solvents are removed by evaporation in vacuo at 85° C. and the residual acid chloride is dissolved in 25 ml. of dry benzene and 6.5 ml. of diethylamine are added. This mixture is allowed to stand at room temperature for 30 minutes, and then treated with 25 ml. of water and extracted three times with 25 ml. of chloroform. The combined extracts are dried over magnesium sulfate, filtered and evaporated in vacuo to yield 3-(N,N-diethylcarboxamido)-9,10-dimethoxy - 1,3,4,6,7-11b - hexahydro - [1,4]oxazino[3,4a] isoquinoline, M.P. 121–124° C. which is further purified through recrystallization from ethyl acetate. The hydrochloride salt as the partial hydrate melts at 205–210° C. Further recrystallization from ispropanol raises the melting point to 230–231° C.

Alternatively, in an atmosphere of nitrogen and with stirring, there are added at room temperature, 45 ml. of oxalyl chloride to a supension of 38.5 g. of 9.10-dimethoxy - 1,3,4,6,7,11b - hexahydro-[1,4]oxazino[3,4a] isoquinoline-3-carboxylic acid hydrochloride (prepared according to the alternative procedure of Part A of this example) in 75 ml. of benzene. This mixture is stirred for 30 minutes, then heated at reflux for two hours and finally evaporated to dryness in vacuo. Seventy-five milliliters of benzene are added to the residue and evaporation is repeated. The residue, consisting essentially of the oxazinoisoquinoline 3-carboxylic acid chloride hydrochloride, is suspended in 100 ml. of methylene dichloride and to the stirred suspension there are added dropwise 23 g. of diethylamine, the temperature of the reaction mixture being maintained at 25° C. by external cooling. Upon completion of the addition, the reaction mixture is allowed to stand at room temperature overnight. After addition of 75 ml. of water, the organic layer is separated, washed with 75 ml. of water, dried over magnesium sulfate, treated with charcoal, filtered and evaporated to dryness. The residual solid is crystallized from ethyl acetate-hexane to yield 3-(N,N-diethylcarboxamido)-9,10-dimethoxy - 1,3,4,6,7,11b - hexahydro[1,4]oxazino[3,4a] isoquinoline (isomer II) M.P. 121–124° C.

The acid chloride hydrochloride can also be obtained via utilization of the appropriate quantity of thionyl chloride in place of oxalyl chloride. Thus a well-stirred mixture of 5.0 g. 9,10 - dimethoxy-1,3,4,6,7,11b-hexahydro-[1,4]oxazino[3,4a]isoquinoline-3-carboxylic acid hydrochloride, 100 ml. of 1,2-dichloroethane, and 5 ml. of thionyl chloride is heated at reflux for 1 hour ("Drierite" guard tube). Removal of the solvent and excess of thionyl chloride in vacuo at 80° C. affords the acid chloride which need not be further purified and is immediately dissolved in 100 ml. of methylene chloride and 5 ml. of triethylamine. One gram of dimethylamine hydrochloride is added with stirring and the mixture is allowed to stand at room temperature for 1 hour. The solvent and excess reagents are removed in vacuo at 80° C. to yield a pale brown solid which is suspended in 50 ml. of saturated aqueous sodium hydrogen carbonate. The mixture is extracted with methylene chloride (3 × 50 ml.) and the combined extracts are dried over sodium sulfate, filtered and evaporated in vacuo to 80° C. to give the crude amide as pale brown prisms. Recrystallization from isopropanol and acetone (twice) yields the pure 3-(N,N-dimethylcarboxamido)-9,10-dmethoxy - 1,3,4,6,7,11b - hexahydro-[1,4]oxazino[3,4a]isoquinoline (isomer II) M.P. 212–213° C.

In a similar fashion by substituting 3-cyano-9,10-methylenedioxy-1,3,4,6,7,11b - hexahydro - [1,4]oxazino[3,4a] isoquinoline and 3 - cyano - 9,10,11-trimethyloxy-1,3,4,7, 11b-hexahydro-[1,4]oxazino[3,4a]isoquinoline in the procedure of this example, there are respectively obtained 3 - (N,N - diethylcarboxamido) - 9,10 - methylenedioxy-1,3,4,6,7,11b - hexahydro-[1,4]oxazino[3,4a]isoquinoline, M.P. 117–118.5° C. (isopropanol) and 3-(N,N-diethylcarboxamido)-9,10,11 - trimethoxy - 1,3,4,6,7,11b - hexahydro - [1,4]oxazino[3,4a]isoquinoline (isomer II) M.P. 91–93° C. (isopropanol).

EXAMPLE 4

3-carboxamido-9,10-dimethoxy-1,3,4,6,7-11b-hexahydro-[1,4]oxazino[3,4a]isoquinoline

(A) A solution of 6 g. of 3-cyano-9,10-dimethoxy-1,3,4,6,7,11b-hexahydro - [1,4]oxazino[3,4a]isoquinoline, 15 ml. of 95% ethanol and 14 g. of concentrated sulfuric acid is heated at reflux for 18 hours. The mixture is then diluted with 60 ml. of cold water, rendered basic with potassium carbonate and extracted with benzene:ether. The combined extracts are evaporated under reduced pressure to yield 3-carbethoxy-9,10-dimethoxy-1,3,4,6,7,11b-hexahydro - [1,4]oxazino[3,4a]isoquinoline (isomer I) as an oil. Trituration with isopropanol yields a solid, M.P. 99–100° C.

The corresponding isomer II is obtained by heating at reflux 6.33 g. of 3-cyano-9,10-dimethoxy-1,3,4,6,7,11b-hexahydro - [1,4]oxazino[3,4a]isoquinoline (mixture of isomers I and II), 93 ml. of 0.5 N ethanolic potassium hydroxide and 21 ml. of water for four hours (100° C. bath temperature, soda-lime guard tube). The solvents are removed in vacuo at 80° C. and the residue is treated with methanolic hydrogen chloride to pH 1 (test paper). The inorganic precipitate is removed by filtration, and washed with methanol, the filtrate being evaporated in vacuo at 80° C. to yield a non-crystalline solid residue. Upon crystallization from hot 95% ethanol this residue yields the crstalline hydrochloride of 3-carbethoxy-9,10-dimethoxy-1,3,4,6,7,11b-hexahydro - [1,4]oxazino[3,4a]isoquinoline. This is dissolved in 60 ml. of water and added with stirring to 250 ml. of saturated aqueous sodium bicarbonate. After standing at room temperature for 30 minutes, the precipitate is collected by filtration and dried in vacuo at 50° C. to yield isomer II as colorless crystals which, after recrytallization from isopropanol, melts at 111.5–113.5° C.

Use of other (lower)alkanols such as methanol, propanol, isopropanol and the like under similar conditions yields the corresponding (lower)alkyl ester intermediate. Thus for example, a suspension of 5.0 g. of 3-cyano-9,10-dimethoxy - 1,3,4,6,7,11b - hexahydro-[1,4]oxazino[3,4a]isoquinoline, M.P. 182–4° C., in 83 ml. of methanol and 2 ml. of water is stirred and cooled in an ice-water bath. Hydrogen chloride gas is passed into the mixture for 30 minutes, and the solution thus obtained is stirred at room temperature for a further 90 minutes. The residue obtained after removal of the solvents in vacuo at 100°, C., is treated with 100 ml. of saturated aqueous sodium hydrogen carbonate and this mixture extracted three times with 100 ml. portions of chloroform. The combined extracts are dried over magnesium sulfate and evaporated in vacuo at 100°. Trituration of the residue with ether yields 3-carbomethoxy-9,10-dimethoxy-1,3,4,6,7,11b-hexahydro-[1,4]oxazino[3,4a]isoquinoline (isomer I), M.P. 108–109° C., after recrystallization from isopropanol. The corresponding isomer II, M.P. 123–124.5° C. of 3-carbomethoxy 9,10-dimethoxy-1,3,4,6,7,11b-hexahydro - [1,4]oxazino[3,4a]isoquinoline is obtained upon subjecting 3-cyano-9,10-dimethoxy-1,3,4,6,7,11b-hexahydro - [1,4]oxazino[3,4a]isoquinoline, M.P. 206–212° C. to this procedure.

(B) Three grams of 3-carbethoxy-9,10-dimethoxy-1,3,4,6,7,11b - hexahydro - [1,4]oxazino[3,4a]isoquinoline (isomer I) dissolved in 15 ml. of ethanol, and 30 ml. of ammonium hydroxide are mixed with shaking and allowed to stand 96 hours. The mixture is then evaporated and the residue triturated with benzene to yield 3-carboxamido - 1,3,4,6,7,11b - hexahydro-[1,4]oxazino[3,4a]isoquinoline (isomer I) which may be recrystallized from absolute ethanol, M.P. 215–216° C.

The identical product is obtained from 3-carbomethoxy-9,10-dimethoxy-1,3,4,6,7,11b - hexahydro - [1,4]oxazino[3,4a]isoquinoline, M.P. 108–109° C.

The corresponding isomer II is obtained in an analogous fashion. Thus 5 g. of 3-carbethoxy-9,10-dimethoxy-1,3,4,6,7,11b-hexahydro-[1,4]oxazino[3,4a]isoquinoline hydrochloride (isomer II), M.P. 111.5–113.5° C., are added to 150 ml. of concentrated aqueous ammonia. The suspension is stirred at room temperature for 18 hours. The insoluble material which forms is collected by filtration and dried in a vacuum desiccator over phosphorus pentoxide for two days to yield 3-carboxamido-9,10-dimethoxy-1,3,4,6,7,11b-hexahydro - [1,4]oxazino[3,4a]isoquinoline (isomer II) as colorless crystals, which after being recrystallized three times from ethanol melts at 236.5–240.5° C.

EXAMPLE 5

3-(N-ethylcarboxamido)9,10-dimethoxy-1,3,4,6,7,11b-hexahydro-[1,4]oxazino[3,4a]isoquinoline

One milliliter of 70% aqueous ethylamine and 24.4 mg. of 3-carbomethoxy-9,10 - dimethoxy-1,3,4,6,7,11b-hexahydro[1,4]oxazino[3,4a]isoquinoline (isomer II) are stirred until dissolution occurs (about 5 minutes) and then allowed to stand at room temperature for 18 hours. The mixture is then evaporated in vacuo at 100° C. to yield a solid residue which is dissolved in 5 ml. of chloroform. This solution is dried over magnesium sulfate, filtered and evaporated in vacuo at 100° C. to yield crystalline 3-(N-ethylcarboxamido) - 9,10-dimethoxy-1,3,4,6,7,11b-hexahydro - [1,4]oxazino[3,4a]isoquinoline isomer II), M.P. 153–154° C.

The corresponding isomer I, of 3-(N-ethylcarboxamido)-9,10 - dimethoxy-1,3,4,6,7,11b - hexahydro-[1,4]oxazino[3,4a]isoquinoline, M.P. 133–137° C., is obtained in a similar fashion from isomer I of the 3-carbomethoxy compound.

EXAMPLE 6

3-(N,N-diethylcarboxamido-9,10-dimethoxy-1,3,4,6,7,11b-hexahydro-[1,4]oxazino[3,4a]isoquinoline

A suspension of 135.1 mg. of 9,10-dimethoxy-1,3,4,6,7,11b-hexahydro - [1,4]oxazino[3,4a]isoquinoline-3-carboxylic acid hydrochloride (isomer II) in 2.5 ml. of methylene chloride is treated with 0.115 ml. of triethylamine. The solution which results is stirred with cooling in an ice-water bath, and 64.2 mg. of isobutyl chloroformate in 1.5 ml. of diethylamine is added and the mixture is stirred for an addition 15 minutes in the cooling bath and for 15 hours at room temperature. The solution is then shaken with 5 ml. of saturated aqueous sodium hydrogen carbonate. The methylene chloride layer is separated and the aqueous layer is washed twice with 5 ml. portions of methylene chloride. The combined methylene chloride extracts are dried over magnesium sulfate, filtered and evaporated in vacuo at 100° C. to yield a pale green gum. This is crystallized from ether to yield 3-(N,N-diethylcarboxamido)-9,10-dimethoxy-1,3,4,6,7,11b - hexahydro - [1,4]oxazino[3,4a]isoquinoline (isomer II), M.P. 121–123° C.

EXAMPLE 7

3-(N,N-diethylcarboxamido)-9,10-dimethoxy-1,3,4,6,7,11b-hexahydro-[1,4]oxazino[3,4a]isoquinoline

A suspension of 2.1441 g. of 3-carbomethoxy-9,10-dimethoxy-1,3,4,6,7,11b - hexahydro - [1,4]oxazino[3,4a]isoquinoline (isomer I) in 75 ml. of water and 8.4 ml. of 1 N aqueous sodium hydroxide is stirred at room temperature until dissolution ocurs (about 15 minutes) and then for one additional hour. To this is then added 8.5 ml. of 1 N aqueous hydrochloric acid and the solution is evaporated in vacuo at 100° C. Thirty milliliters of benzene are added to the white solid and the solvent is evaporated in vacuo at 100° C. The residue is dried in a vacuum desiccator for 24 hours to yield the free acid (isomer I).

The above acid, without further purification, is suspended in 50 ml. of methylene chloride and treated with 1.07 ml. of triethylamine. After stirring with cooling in an ice-water bath for 15 minutes, 1.0581 g. of isobutyl chloroformate in 10 ml. of methylene chloride is added, and the mixture is stirred for a further 30 minutes with continued cooling. Diethylamine (0.9 ml.) is then added and the mixture is stirred in the cooling bath for 30 minutes and at room temperature for 4 hours. Finally mixture is allowed to stand for 16 hours.

The solvent is removed in vacuo at 100° C., the solid residue treated with 50 ml. of 1 N aqueous hydrochloric acid and washed with ether (1× 50 ml., 2× 25 ml.), discarding the extracts. Excess solid sodium hydrogen carbonate is added to the aqueous solution, and the mixture is extracted with methylene chloride (1× 50 ml., 2× 25 ml.). The combined extracts are dried over sodium sulfate, filtered and evaporated in vacuo at 100° C. to yield a colorless solid which crystallizes in ether upon scratching. Recrystallization from isopropanol affords colorless prisms of the title compound (isomer I) which is recrystallized twice from isopropanol, M.P. 150–153° C.

EXAMPLE 8

3-(N,N-diethylcarboxamido)-9-methoxy-1,3,4,6,7,11b-hexahydro-[1,4]oxazino[3,4a]isoquinoline By employing 2-(3-methoxyphenyl)ethylamine in place of 2-(3,4-dimethoxyphenyl)ethylamine in Example 2, there is sequentially obtained 2-hydroxy-3-[2-(3-methoxyphenyl)ethyl]-propionamide, M.P. 109–110° C. (ethanol), 2 - carboxamido-4-[2-(3-methoxyphenyl)ethyl]morpholin-5-one, M.P. 144–145° C. (isopropanol), and a mixture of isomers I and II of 3-cyano-9-methoxy-1,3,4,6, 7,11b-hexhydro-[1,4]oxazino[3,4a]isoquinoline, as shown by N.M.R. analysis.

A suspension of 999 mg. of the above nitrile mixture in 16.4 ml. of 0.5 N ethanolic potassium hydroxide is heated at reflux for 4 hours (soda-lime guard tube). Water (3.3 ml.) is then added and the mixture is heated at reflux for an additional hour. After cooling, 3.4 ml. of 2.5 N aqeuous hydrochloric acid are added and the mixture is evaporated in vacuo at 90° C. The yellow solid is treated with 5 ml. of benzene and again evaporated in vacuo at 90° C. The residue is dried in a vacum desiccator for 24 hours to yield 9-methoxy-1,3,4,6,7-11b-hexahydro-[1,4] oxazino[3,4a]isoquinoline-3-carboxylic acid. This is suspended in 25 ml. of methylene chloride and 0.628 ml. of triethylamine are added. The mixture is stirred with cooling in an ice-water bath, and a solution of 0.588 ml. of isobutyl chloroformate in 6 ml. of methylene chloride is added dropwise. After stirring in the cooling bath for 30 minutes, 0.526 ml. of diethylamine is added. The mixture is stirred in the cooling bath for a further 30 minutes, then at room temperature for 4 hours and finally allowed to stand at room temperature for 18 hours. The solvent and excess reagent are removed in vacuo at 90° C., the residue is dissolved in 25 ml. of 1 N aqueous hydrochloric acid, and the solution is washed with ether (2× 10 ml.), discarding the extracts. The aqueous layer is treated with excess solid sodium hydrogen carbonate and extracted with methylene chloride (4× 20 ml.). The combined extracts are dried over magnesium sulfate, filtered and evaporated in vacuo at 90° C. to yield an oil. Addition of ether causes precipitation of a solid. This is washed several times by decantation with ether. Evaporation of the solvent from the combined washings yields an oil which crystallises upon standing. This material is purified by chromatography on neutral alumina (activity I, 60 g.), eluting with methylene chloride-methanol (99:1) to yield the pure amide which is recrystallized from ether, M.P. 100–100.5° C.

What is claimed is:
1. A compound of the formula:

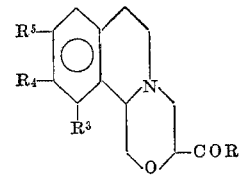

wherein:
R is hydroxy, chloro, bromo or (lower)alkoxy;
each of $R^3$ and $R^4$ is hydrogen or (lower)alkoxy;
$R^5$ is (lower)alkoxy or
$R^4$ and $R^5$ taken together when $R^3$ is hydrogen are methylenedioxy.

2. A compound according to claim 1 wherein R is methoxy or ethoxy, each of $R^3$ and $R^4$ is hydrogen or methoxy and $R^5$ is methoxy.

3. The compound according to claim 2 wherein each of R, $R^4$ and $R^5$ is methoxy and $R^3$ is hydrogen.

4. The compound according to claim 2 wherein R is ethoxy, $R^3$ is hydrogen and each of $R^4$ and $R^5$ is methoxy.

5. The compound according to claim 1 wherein R is hydroxy, $R^3$ is hydrogen and each of $R^4$ and $R^5$ is methoxy.

6. The compound according to claim 1 wherein R is chloro, $R^3$ is hydrogen and each of $R^4$ and $R^5$ is methoxy.

7. A compound of the formula:

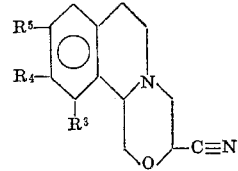

wherein:
each of $R^3$ and $R^4$ is hydrogen or (lower)alkoxy;
$R^5$ is (lower)alkoxy; or
$R^4$ and $R^5$ taken together when $R^3$ is hydrogen are methylenedioxy.

8. A compound according to claim 7 wherein each of $R^3$ and $R^4$ is hydrogen or methoxy and $R^5$ is methoxy.

9. The compound according to claim 8 wherein $R^3$ is hydrogen and each of $R^4$ and $R^5$ is methoxy.

References Cited

Kröhnke et al.: Chemische Berichte, vol. 97, pp. 3566–76 (1964).

Schneider et al.: Archiv. Der Pharmazie, vol. 294, pp. 645–54 (1961).

NORMA S. MILESTONE, Primary Examiner

N. TROUSOF, Assistant Examiner

U.S. Cl. X.R.

260—247.2, 247.5, 247.7, 348, 465, 559, 570.8, 999, 340.5